(12) United States Patent
Kitawaki et al.

(10) Patent No.: US 12,033,665 B2
(45) Date of Patent: Jul. 9, 2024

(54) THIN SUBSTRATE BUILT-IN HARD DISK DRIVE AND BASE PLATE MEMBER FOR THIN SUBSTRATE BUILT-IN HARD DISK DRIVE

(71) Applicants: UACJ Corporation, Tokyo (JP); Furukawa Electric Co., Ltd., Tokyo (JP)

(72) Inventors: Kotaro Kitawaki, Tokyo (JP); Hideyuki Hatakeyama, Tokyo (JP); Wataru Kumagai, Tokyo (JP); Ryo Sakamoto, Tokyo (JP)

(73) Assignees: UACJ Corporation, Tokyo (JP); Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 18/303,899

(22) Filed: Apr. 20, 2023

(65) Prior Publication Data

US 2024/0119967 A1    Apr. 11, 2024

Related U.S. Application Data

(63) Continuation of application No. PCT/JP2021/037203, filed on Oct. 7, 2021.

(30) Foreign Application Priority Data

Oct. 22, 2020  (JP) ................. 2020-177486

(51) Int. Cl.
*G11B 25/04* (2006.01)
*C22C 21/00* (2006.01)
(Continued)

(52) U.S. Cl.
CPC ............ *G11B 25/043* (2013.01); *C22C 21/00* (2013.01); *G11B 33/02* (2013.01); *G11B 33/022* (2013.01); *C22C 21/02* (2013.01)

(58) Field of Classification Search
None
See application file for complete search history.

(56) References Cited

U.S. PATENT DOCUMENTS

2015/0202680 A1    7/2015  Sato
2017/0327930 A1   11/2017  Kitawaki et al.
(Continued)

FOREIGN PATENT DOCUMENTS

JP    2001184845 A    7/2001
JP    2019128966 A    8/2019
(Continued)

OTHER PUBLICATIONS

[English Translation] International Search Report and Written Opinion for International Patent Application No. PCT/JP2021/037203 dated Dec. 21, 2021, pp. all.

(Continued)

*Primary Examiner* — Craig A. Renner
(74) *Attorney, Agent, or Firm* — Dorsey & Whitney LLP (57) ABSTRACT

An example thin substrate built-in hard disk drive includes a magnetic disk in a disk shape having a through-hole at the center, a spindle motor inserted into the through-hole of the magnetic disk and co-rotatably supporting the magnetic disk, and a base plate made of an aluminum alloy and supporting the spindle motor. The base plate has a metallographic structure in which a perimeter of a second phase particle having a longest diameter of 10 μm or more is 3 mm/mm² or more, and the number of second phase particles having a longest diameter of 500 μm or more is 0 particles/mm².

4 Claims, 4 Drawing Sheets

(51) Int. Cl.
    *G11B 33/02*      (2006.01)
    *C22C 21/02*      (2006.01)

(56)          References Cited

U.S. PATENT DOCUMENTS

2019/0066724 A1*   2/2019   Nakamura et al. ...... C22C 21/00
2019/0228797 A1    7/2019   Hashimoto et al.
2020/0377984 A1*  12/2020   Kitawaki et al. ....... C22C 21/00

FOREIGN PATENT DOCUMENTS

JP      2020009512 A    1/2020
WO      2014010678 A1   1/2014
WO      2016068293 A1   5/2016

OTHER PUBLICATIONS

English Translation of International Preliminary Report on Patentability Chapter I (PCT/IB/373) for International Patent Application No. PCT/JP2021/037203 dated Apr. 13, 2023, pp. all.

* cited by examiner

THIN SUBSTRATE BUILT-IN HARD DISK DRIVE AND BASE PLATE MEMBER FOR THIN SUBSTRATE BUILT-IN HARD DISK DRIVE

CROSS REFERENCE TO RELATED APPLICATIONS

This is a continuation application of International Patent Application No. PCT/JP2021/037203 filed Oct. 7, 2021, which claims the benefit of Japanese Patent Application No. 2020-177486 filed Oct. 22, 2020. The aforementioned applications are incorporated herein by reference, in their entirety, for any purpose.

BACKGROUND

Technical Field

The present disclosure relates to a thin substrate built-in hard disk drive and a base plate member for a thin substrate built-in hard disk drive.

Description of the Related Art

In recent years, a hard disk drive (also referred to as an "HDD" hereinafter) has been widely used as a recording device of a computer. In an HDD, a magnetic disk drive for supporting and rotating a disk for a storage medium is mounted, and the magnetic disk drive generally has one or a plurality of magnetic disks for recording data thereon, a spindle motor for rotating the magnetic disk, and a clamp member for fixing an inner diameter side portion of the magnetic disk. The HDD is provided with, in addition to such a magnetic disk drive, a magnetic head that conducts data processing on each magnetic disk, an actuator that supports the magnetic head movably with respect to the magnetic disk, a swing arm that rotates and positions the actuator, and the like.

By the way, HDDs have been required to have large capacity and high density for the needs of multimedia and the like in recent years. Moreover, for larger capacity, the number of magnetic disks mounted in a storage device has increased, and with this, thinning of magnetic disks has been required. However, if a magnetic disk is thinned, there is a problem of a decrease in rigidity. If the rigidity is decreased, impact resistance that indicates the degree of difficulty in deformation of magnetic disk is decreased, and therefore, improvement in impact resistance is required.

Under such circumstances, magnetic disks having high rigidity have been strongly desired and studied in recent years. For example, in International Publication No. WO2016/068293, a method for improving impact resistance by incorporating Si that contributes to rigidity improvement into an aluminum alloy substrate for a magnetic disk, in a large amount, has been proposed.

However, in the method for improving rigidity by increasing a content of Si, which is disclosed in International Publication No. WO2016/068293, the amount of Si that can be added is limited due to the balance with manufacturability, and the target good impact resistance has not been obtained in the existing circumstances, though the method is effective for the improvement in impact resistance.

SUMMARY

The present disclosure is related to providing a thin substrate built-in hard disk drive and a base plate member for a thin substrate built-in hard disk drive which are excellent in impact resistance.

The present inventors have found that by clarifying correlation between a magnetic disk and a base plate in a thin substrate built-in hard disk drive, a thin substrate built-in hard disk drive and a base plate member for a thin substrate built-in hard disk drive each of which can improve impact resistance of a magnetic disk can be provided.

One aspect of the present disclosure is a thin substrate built-in hard disk drive including a magnetic disk in a disk shape having a through-hole at the center, a spindle motor inserted into the through-hole of the magnetic disk and co-rotatably supporting the magnetic disk, and a base plate made of an aluminum alloy and supporting the spindle motor, wherein the base plate has a metallographic structure in which a perimeter of a second phase particle having a longest diameter of 10 μm or more is 3 mm/mm$^2$ or more, and the number of second phase particles having a longest diameter of 500 μm or more is 0 particles/mm$^2$.

Another aspect of the present disclosure is a base plate member made of an aluminum alloy, for a thin substrate built-in hard disk drive, which has a metallographic structure in which a perimeter of a second phase particle having a longest diameter of 10 μm or more is 3 mm/mm$^2$ or more, and the number of second phase particles having a longest diameter of 500 μm or more is 0 particles/mm$^2$.

According to the present disclosure, in a thin substrate built-in hard disk drive including a magnetic disk in a disk shape having a through-hole at the center, a spindle motor inserted into the through-hole of the magnetic disk and co-rotatably supporting the magnetic disk, and a base plate made of an aluminum alloy and supporting the spindle motor, the base plate has a metallographic structure in which a perimeter of a second phase particle having the longest diameter of 10 μm or more is 3 mm/mm$^2$ or more, and the number of second phase particles having the longest diameter of 500 μm or more is 0 particles/mm$^2$, and therefore, a thin substrate built-in hard disk drive capable of improving impact resistance of the magnetic disk can be provided.

Moreover, a base plate member made of an aluminum alloy, for a thin substrate built-in hard disk drive has a metallographic structure in which a perimeter of a second phase particle having the longest diameter of 10 μm or more is 3 mm/mm$^2$ or more, and the number of second phase particles having the longest diameter of 500 μm or more is 0 particles/mm$^2$, and therefore, a base plate member for a thin substrate built-in hard disk drive capable of improving impact resistance of the magnetic disk can be provided.

DETAILED DESCRIPTION

Hereinafter, the thin substrate built-in hard disk drive and the base plate member for a thin substrate built-in hard disk drive in the present embodiments will be described with reference to the drawings.

Figure 1:
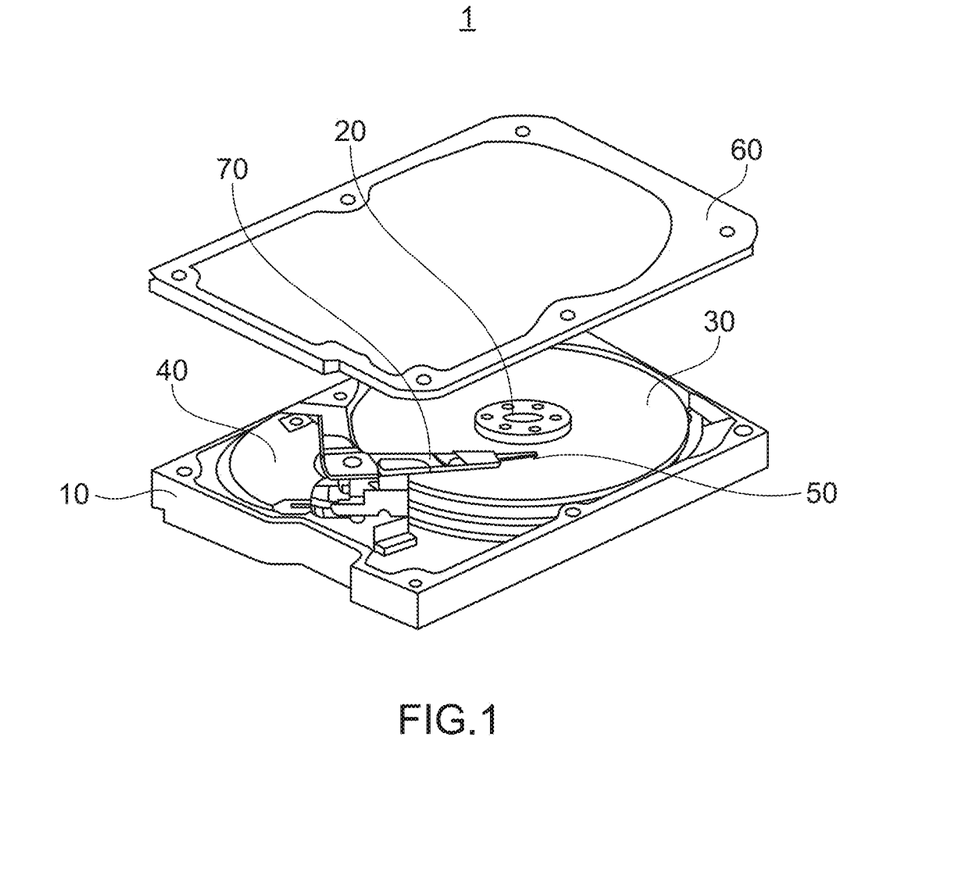
FIG. 1 is a schematic view showing one example of the thin substrate built-in hard disk drive in the present embodiment.

FIG. 1 is a schematic view showing one example of the thin substrate built-in hard disk drive in the present embodiment. As shown in FIG. 1, the thin substrate built-in hard disk drive 1 in the present embodiment includes a magnetic disk 30 in a disk shape having a through-hole at the center, a spindle motor 20 inserted into the through-hole of the magnetic disk 30 and co-rotatably supporting the magnetic disk 30, and a base plate 10 made of an aluminum alloy, which supports the spindle motor 20. Furthermore, the thin substrate built-in HDD 1 includes a magnetic head 50 that conducts data processing on the magnetic disk 30, a swing arm 70 that movably supports the magnetic head 50 with respect to the magnetic disk 30, and an actuator 40 that rotates and positions the swing arm 70. The number of the magnetic disks 30 may be one or multiple. By joining the base plate 10 to a cover plate 60, various parts such as the magnetic disk 30 are protected.

A. Base plate (base plate member) made of aluminum alloy

A metallographic structure of the base plate (base plate member) made of an aluminum alloy will be described. In the following description, the constitution, characteristics, etc. of the base plate apply equally to the base plate member.

(Perimeter of Second Phase Particle Having the Longest Diameter of 10 μm or More)

In the metallographic structure of the base plate made of an aluminum alloy, intermetallic compounds, particles, etc. exist as second phase particles. Specifically, the base plate has a metallographic structure in which a perimeter of a second phase particle having the longest diameter of 10 μm or more is 3 mm/mm$^2$ or more. Since the perimeter of the second phase particle having the longest diameter of 10 μm or more existing in the metallographic structure of the base plate is 3 mm/mm$^2$ or more, impact resistance of the base plate is improved. The reason for this is thought to be that at the interface between the second phase particle and the aluminum alloy matrix, vibration energy, etc. at impact are absorbed. Due to this, when an HDD is subjected to an impact due to falling of the HDD or the like, the impact is mitigated at the base plate because the impact resistance of the base plate is high, and the impact transmitted to the magnetic disk is reduced. As a result, the impact resistance of the magnetic disk is improved, and deformation of the magnetic disk can be suppressed.

On the other hand, when the perimeter of the second phase particle having the longest diameter of 10 μm or more existing in the metallographic structure of the base plate is less than 3 mm/mm$^2$, vibration energy absorbed at the interface between the second phase particle and the aluminum alloy matrix is small, and therefore, the impact resistance is not improved. On that account, the perimeter of the second phase particle existing in the metallographic structure of the base plate is in the range of 3 mm/mm$^2$ or more, and it is preferable that the perimeter be in the range of 5 mm/mm$^2$ or more. The upper limit of the perimeter is not particularly limited, but considering alloy components, etc. of the base plate, it is preferable that the perimeter be 1000 mm/mm$^2$ or less. A second phase particle having the longest diameter of less than 10 μm has little influence on the impact resistance, and therefore, the lower limit of the longest diameter of the second phase particle is less than 10 μm.

Figure 2:
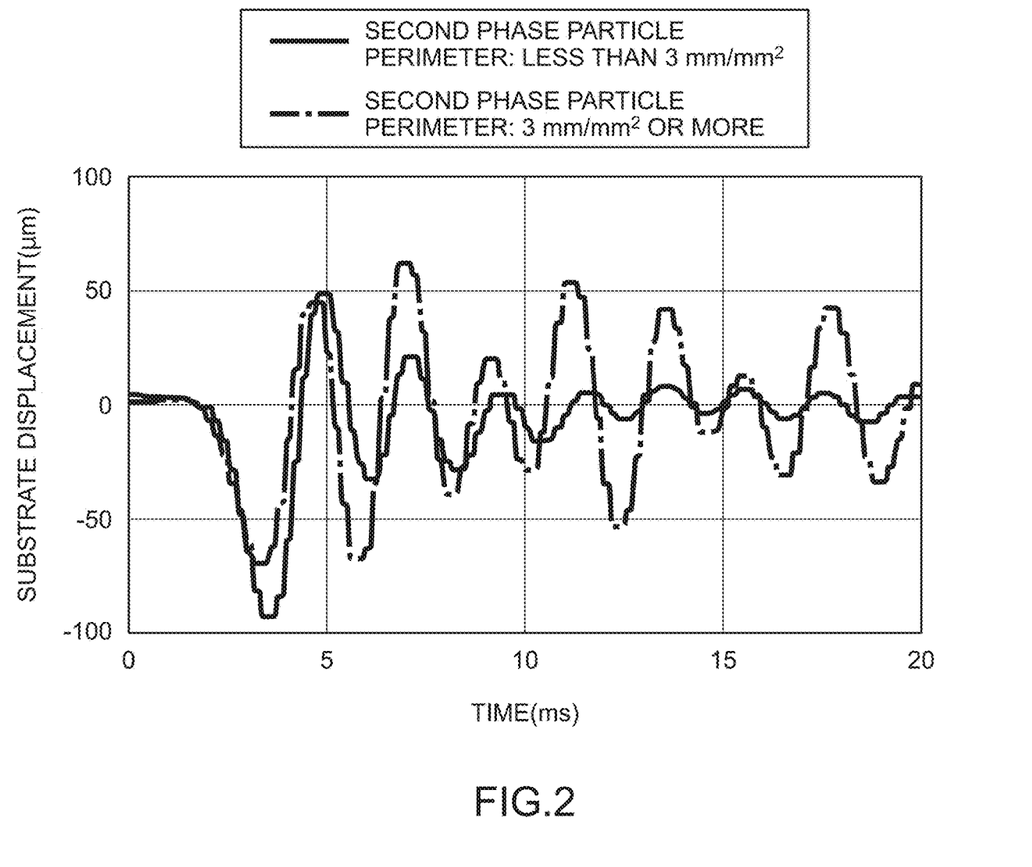
FIG. 2 shows a relationship between a time and a substrate (disk) displacement when an impact test is conducted using a base plate in which a perimeter of a second phase particle having the longest diameter of 10 μm or more is 3 mm/mm$^2$ or more and a base plate in which a perimeter thereof is less than 3 mm/mm$^2$.

FIG. 2 shows a relationship between a time and a substrate (disk) displacement when an impact test is conducted using a base plate in which a perimeter of a second phase particle having the longest diameter of 10 μm or more is 3 mm/mm$^2$ or more and a base plate in which a perimeter thereof is less than 3 mm/mm$^2$. As shown in FIG. 2, it is understood that the base plate containing, in its metallographic structure, a second phase particle having the longest diameter of 10 μm or more, a perimeter of which is 3 mm/mm$^2$ or more, is smaller in the maximum displacement of the substrate (disk), that is, deformation, than the base plate containing, in its metallographic structure, a second phase particle having the longest diameter of 10 μm or more, a perimeter of which is less than 3 mm/mm$^2$. As can be seen from this, by the use of a base plate containing, in its metallographic structure, a second phase particle having the longest diameter of 10 μm or more, a perimeter of which is 3 mm/mm$^2$ or more, the impact transmitted to the magnetic disk can be reduced, and therefore, the impact resistance of the magnetic disk can be improved.

The second phase particle mainly means a deposit, a crystallized substance, or the like, of an intermetallic compound. Specifically, Al—Fe-based intermetallic compounds, such as $Al_3Fe$, $Al_6Fe$, $Al_6(Fe, Mn)$, Al—Fe—Si, Al—Fe—Mn—Si, Al—Fe—Ni, and Al—Cu—Fe, can be mentioned. In addition to the Al—Fe-based intermetallic compounds, intermetallic compounds, such as Mg—Si-based intermetallic compounds ($Mg_2Si$, etc.), Al—Mn-based intermetallic compounds ($Al_6Mn$, Al—Mn—Si, etc.), Al—Ni-based intermetallic compounds ($Al_3Ni$, etc.), Al—Cu-based intermetallic compounds ($Al_2Cu$, etc.), Al—Cr-based intermetallic compounds ($Al_7Cr$, etc.), and Al—Zr-based intermetallic compounds ($Al_3Zr$, etc.) can be mentioned, and in the second phase particles, Si particles, etc. are also included.

(Second Phase Particle Having the Longest Diameter of 500 μm or More)

The base plate has a metallographic structure in which the number of second phase particles having the longest diameter of 500 μm or more is 0 particles/mm$^2$. Though, as previously described, for larger capacity of HDDs, decreasing of thickness of the magnetic disk to increase the number of disks mounted has been studied, because the number of magnetic disks mounted is increased, the thickness of the base plate also tends to become smaller. If the thickness of the base plate is small and if a coarse second phase particle (500 μm or more) exists in the metallographic structure of the base plate, a crack or a hole may be formed from there as a starting point. In that case, it is thought that the impact resistance of the base plate decreases, and as a result, it also leads to a decrease in impact resistance of the magnetic disk. If a crack or a hole is formed in the base plate, helium or the like enclosed in the HDD may leak outside. On that account, a base plate in which 1 particle/mm$^2$ or more of coarse second phase particles each having the longest diameter of 500 μm or more exist in the metallographic structure is ineligible for a base plate applied to the HDD. From such a viewpoint, it is thought that the impact resistance of the magnetic disk is improved because the number of second phase particles having the longest diameter of 500 μm or more is 0 particles/mm$^2$ in the metallographic structure of the base plate. The upper limit of the longest diameter of 500 μm or more is not particularly limited, but it is naturally decided by the alloy components, etc. and is about 3000 μm.

The unit of the second phase particle having the longest diameter of 500 μm or more, particles/mm², means the number of the second phase particles having the longest diameter of 500 μm or more which exist in 1 mm².

Figure 3:
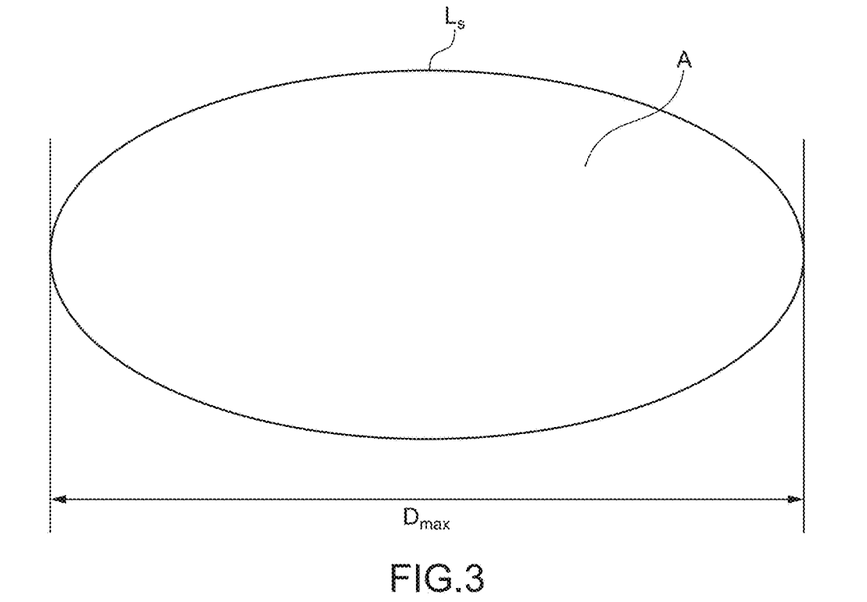
FIG. 3 is a schematic view showing a perimeter and the longest diameter of a second phase particle.
Figure 5:
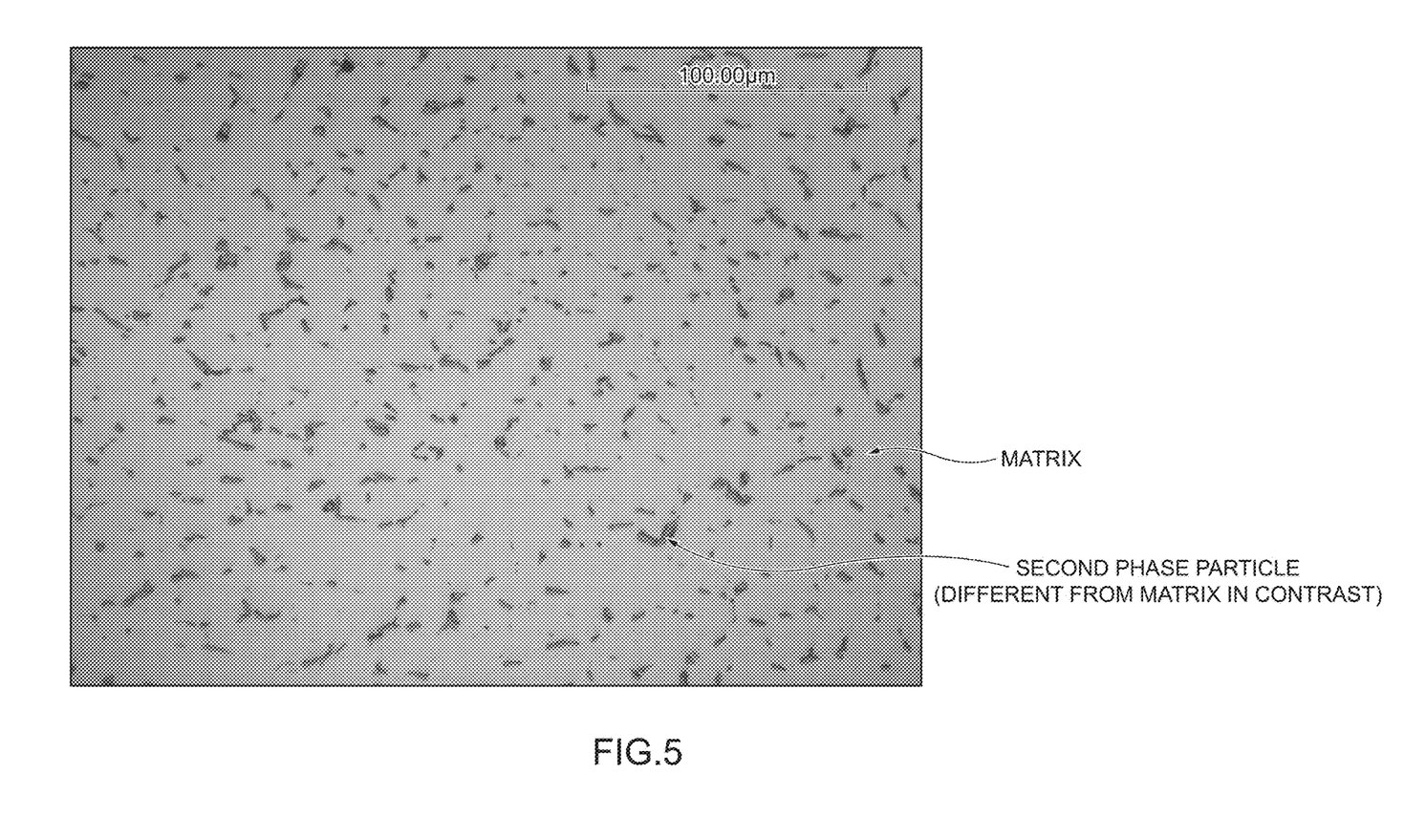
FIG. 5 shows one example of an image of a metallographic structure of a base plate photographed by an optical microscope.

As shown in FIG. 3, the longest diameter of the second phase particle existing in the metallographic structure of the base plate is measured from a plane image of a second phase particle A observed by an optical microscope. Specifically, first, in the second phase particle A, a straight-line distance between one point on a contour line of the second phase particle A observed and another point on the contour line is measured, as shown in FIG. 3. Thereafter, this straight-line distance is measured with respect to all points on the contour line, and finally, the largest diameter selected from all of these straight-line distances is selected as the longest diameter. The largest diameter thus selected is defined as the longest diameter D. of the second phase particle. The perimeter of the second phase particle means a length Ls on a contour line of an intermetallic compound A observed in a plane image of the second phase particle A observed by an optical microscope, as shown in FIG. 3. The unit of the perimeter, mm/mm², means the total of perimeters of all second phase particles each having the longest diameter of 10 μm or more which exist in 1 mm². In the observation by an optical microscope, photographing is conducted without using a polarizing filter. Distinguishment between the second phase particle and the matrix is made by light and dark contrasts in an image photographed by the optical microscope, and as shown in FIG. 5, a portion that has darker or lighter contrast than the matrix is determined as a second phase particle.

The perimeter and the longest diameter of the second phase particle can be calculated not only by observation by an optical microscope but also by SEM (scanning electron microscope). In the case of SEM, distinguishment between the second phase particle and the matrix is possible by light and dark contrasts in a COMP image (compositional image). A portion having darker or lighter contrast than the matrix is identified as the second phase particle. The SEM observation is conducted using Hitachi FlexSEM 100 (scanning electron microscope, operation Ver. 1.9) under the conditions of acceleration voltage: 15 kv, magnification: 1000×, scan resolution: 1024 pixels, scan dwell time: 35 μs, and area of field of view: 0.07 mm² or more. After that, using particle analysis software (trade name: particle analysis software A-zo-kun, manufactured by Asahi Kasei Engineering Corporation), the perimeter (mm/mm²) and the longest diameter of the second phase particle are calculated. When SEM is used, the perimeter and the longest diameter of the second phase particle can be calculated by combining it with particle analysis software. Using, as the particle analysis software, Oxford AZtec (Ver. 3.3 SPI), second phase particles having darker or lighter contrast than the matrix are analyzed one by one by EDS (Energy Dispersive X-ray Spectroscopy), and a perimeter (mm/mm²) and the longest diameter of a second phase particle are calculated. The time spent in analysis by EDS per one second phase particle detected is 2 seconds.

The base plate is formed from an aluminum alloy, and preferably consists of an aluminum alloy. In the aluminum alloy, the total of contents of Fe (iron), Mn (manganese) and Ni (nickel) is 0.05 mass % or more and 7.0 mass % or less, and the balance is composed of aluminum and unavoidable impurities. The aluminum alloy may further optionally contain Si (silicon): 0 mass % or more and 24.0 mass % or less, Zn (zinc): 0 mass % or more and 7.0 mass % or less, Cu (copper): 0 mass % or more and 5.0 mass % or less, Mg (magnesium): 0 mass % or more and 3.5 mass % or less, Be (beryllium): 0 mass % or more and 0.0015 mass % or less, Cr (chromium): 0 mass % or more and 0.30 mass % or less, Zr (zirconium): 0 mass % or more and 0.15 mass % or less, Sr (strontium): 0 mass % or more and 0.1 mass % or less, Na (sodium): 0 mass % or more and 0.1 mass % or less, and P (phosphorus): 0 mass % or more and 0.1 mass % or less, and preferably, the total of contents of Ti (titanium), B (boron) and V (vanadium) is 0 mass % or more and 0.500 mass % or less.

(Iron, Manganese, Nickel)

Fe mainly exists as a second phase particle (Al—Fe-based intermetallic compound, or the like), and partially exists as a solid solution in the matrix. Due to the formation of a second phase particle and a solid solution in the matrix, Fe exerts an effect of improving impact resistance of the base plate. Mn and Ni also each mainly exist as a second phase particle (Al—Mn-based intermetallic compound, Al—Ni-based intermetallic compound, or the like), and each partially exist as a solid solution in the matrix. Due to the formation of a second phase particle and a solid solution in the matrix, Mn and Ni also exert an effect of improving impact resistance of the base plate. However, when the total of contents of Fe, Mn and Ni is less than 0.05 mass %, formation of second phase particles is insufficient, and the impact resistance may be decreased. On the other hand, if the total of contents of Fe, Mn and Ni exceeds 7.0 mass %, coarse second phase particles are formed, and the impact resistance may be decreased. Therefore, it is preferable that the total of contents of Fe, Mn and Ni be 0.05 mass % or more and 7.0 mass % or less.

(Silicon)

When the aluminum alloy contains Si, Si mainly exists as a second phase particle (Si particle, or the like), and has an effect of improving impact resistance of the base plate. On that account, 24.0 mass % or less of Si may be optionally added into the aluminum alloy. By the Si content of 24.0 mass % or less in the aluminum alloy, formation of coarse second phase particles is suppressed. Due to this, an effect of further improving impact resistance of the base plate can be obtained. When the aluminum alloy contains Si, it is preferable that the content of Si be 5.0 mass % or more, because formation of second phase particles is accelerated and impact resistance improving action is sufficiently exerted.

(Zinc)

When the aluminum alloy contains Zn, Zn forms a second phase particle together with another element added, and has an effect of improving impact resistance of the base plate. On that account, 7.0 mass % or less of Zn may be optionally added into the aluminum alloy. By the Zn content of 7.0 mass % or less in the aluminum alloy, formation of coarse second phase particles is suppressed. Due to this, an effect of further improving impact resistance of the base plate can be obtained.

(Copper)

When the aluminum alloy contains Cu, Cu mainly exists as a second phase particle (Al—Cu-based intermetallic compound, or the like), and has an effect of improving impact resistance of the base plate. On that account, 5.0 mass % or less of Cu may be optionally added into the aluminum alloy. By the Cu content of 5.0 mass % or less in the aluminum alloy, formation of coarse second phase particles is suppressed. Due to this, an effect of further improving impact resistance of the base plate can be obtained.

(Magnesium)

When the aluminum alloy contains Mg, Mg forms a second phase particle together with another element added, and has an effect of improving impact resistance of the base plate. On that account, 3.5 mass % or less of Mg may be optionally added into the aluminum alloy. By the Mg content of 3.5 mass % or less in the aluminum alloy, formation of coarse second phase particles is suppressed. Due to this, an effect of further improving impact resistance of the base plate can be obtained.

(Beryllium)

When the aluminum alloy contains Be, Be is preferentially oxidized during melting, so that it is possible to suppress oxidation of other elements added, that is, other elements added easily form second phase particles, and therefore, it has an effect of further improving impact resistance of the base plate. On that account, 0.0015 mass % or less of Be may be optionally added into the aluminum alloy. However, even if Be is contained in an amount exceeding 0.0015 mass %, its effect is saturated, and no further prominent improving effect is obtained.

(Chromium)

When the aluminum alloy contains Cr, Cr mainly exists as a second phase particle (Al—Cr-based intermetallic compound, or the like), and has an effect of improving impact resistance of the base plate. On that account, 0.30 mass % or less of Cr may be optionally added into the aluminum alloy. By the Cr content of 0.30 mass % or less in the aluminum alloy, formation of coarse second phase particles is suppressed. Due to this, an effect of further improving impact resistance of the base plate can be obtained.

(Zirconium)

When the aluminum alloy contains Zr, Zr mainly exists as a second phase particle (Al—Zr-based intermetallic compound, or the like), and has an effect of improving impact resistance of the base plate. On that account, 0.15 mass % or less of Zr may be optionally added into the aluminum alloy. By the Zr content of 0.15 mass % or less in the aluminum alloy, formation of coarse second phase particles is suppressed. Due to this, an effect of further improving impact resistance of the base plate can be obtained.

(Sodium, Strontium, Phosphorus)

When the aluminum alloy contains at least one of Na, Sr and P, Na, Sr and P have effects of decreasing size heterogeneity of second phase particles (mainly Si particles) in the base plate and reducing variation in impact resistance of the base plate. On that account, one or two or more of elements selected from the group consisting of Na of 0.1 mass % or less, Sr of 0.1 mass % or less, and P of 0.1 mass % or less may be optionally added into the aluminum alloy. However, even if each of Na, Sr and P is contained in an amount exceeding 0.1 mass %, its effect is saturated, and no further prominent improving effect is obtained.

(Titanium, Boron, Vanadium)

When the aluminum alloy contains at least one of Ti, B and V, Ti, B and V have effects of decreasing size heterogeneity of second phase particles in the base plate and reducing variation in impact resistance of the base plate. On that account, when at least one of Ti, B and V is added, it is preferable that the total of contents of Ti, B and V be in the range of 0.500 mass % or less. However, even if Ti, B and V are contained in the total amount exceeding 0.500 mass %, its effect is saturated, and no further prominent improving effect is obtained.

(Other Elements Such as Unavoidable Impurities)

In the base plate made of an aluminum alloy, elements other than the aforementioned components, which become unavoidable impurities, may be contained. Examples of these elements include Ga and Ca, and as long as the content of each of the elements is 0.10 mass % or less and the total content thereof is 0.30 mass % or less, the working-effect of the present disclosure is not impaired.

(Thickness of Base Plate)

It is preferable that the thickness of the base plate be 0.5 mm or more and 2.0 mm or less. If the thickness of the base plate is less than 0.5 mm, the base plate may be deformed when an HDD falls during installation or the like. If the thickness of the base plate is larger than 2.0 mm, the number of magnetic disks mounted in the HDD decreases, and therefore such a thickness is undesirable. On that account, the thickness of the base plate is preferably 0.5 mm or more and 2.0 mm or less, and is more preferably 0.5 mm or more and 1.5 mm or less.

Figure 4:
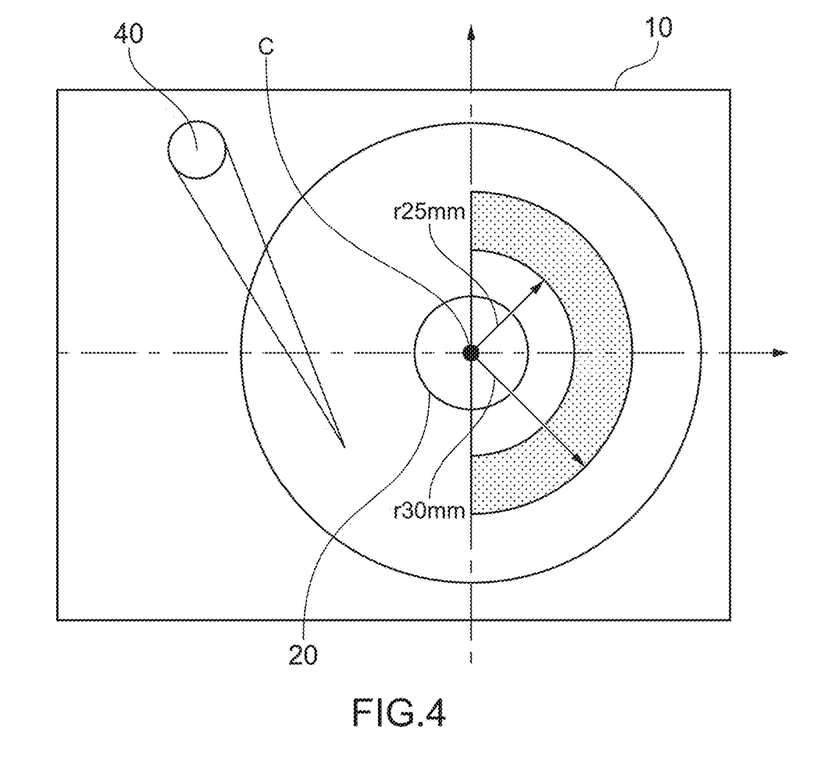
FIG. 4 is a schematic view showing an area where a thickness of a base plate (base plate member) is measured.

As shown in FIG. 4, regarding the thickness of the base plate, a thickness of a base plate 10 is measured at an optional place in an area on one surface side of the disk, that is, an area indicated by solid fill, of an area enclosed by a radius r 25 mm and a radius r 30 mm from the center C of the disk, and the measured value is defined as the thickness of the base plate 10. The base plate 10 in this area has a small thickness and has influence on the deformation of the base plate, and therefore, by controlling the thickness of the base plate 10 in this area, the aforementioned action can be exerted. The thickness of the base plate 10 is measured using, for example, a micrometer.

B. Method for producing base plate made of aluminum alloy

The base plate can be generally produced by a common method such as die casting or casting. When the base plate is prepared, an aluminum alloy base material that becomes a raw material is melted to prepare a molten metal, and the molten metal is subjected to die casting or casting into a shape of a base plate. In the step of preparing/casting the molten metal, it is preferable that a time in which the molten metal temperature during keeping/casting of the molten metal is in the range of 550 to 700° C. be 0.1 to 1 hour. Since the time in which the molten metal temperature is in the range of 550 to 700° C. is 0.1 to 1 hour, formation of coarse second phase particles is suppressed, and a large number of fine second phase particles are formed. On that account, the perimeter of the second phase particle increases, and there is an effect of improving impact resistance of the base plate.

C. Magnetic disk

A base material of the magnetic disk is not particularly limited, but it is preferable that the base material be, for example, a base material made of an aluminum alloy or a glass. It is preferable that a thickness of the magnetic disk be 0.20 mm or more and 0.58 mm or less, and it is more preferable that the thickness be 0.48 mm or less. If the thickness of the magnetic disk is less than 0.20 mm, deformation or cracking of the magnetic disk may occur when the magnetic disk falls during installation of the HDD. On the other hand, if the thickness of the magnetic disk is larger than 0.58 mm, the impact resistance is improved, but the number of magnetic disks that can be mounted in the HDD decreases, and therefore such a thickness is not suitable for the promotion of thinning of the magnetic disk. The magnetic disk can be prepared using a substrate for a magnetic disk, such as an aluminum alloy substrate or a glass substrate.

As the substrate for a magnetic disk, for example, an aluminum alloy substrate formed of an aluminum alloy can be used. Hereinafter, alloy composition of the aluminum alloy substrate for a magnetic disk and a production method thereof will be each described in detail.

(Alloy Composition of Aluminum Alloy)

It is preferable that the aluminum alloy used for the aluminum alloy substrate for a magnetic disk contain elements, such as Mg, Cu, Zn, and Cr. Moreover, it can also contain elements capable of improving rigidity, such as Fe, Mn, and Ni.

Specifically, the aluminum alloy used for the aluminum alloy substrate, in one embodiment, contains 1.0 mass % or more and 6.5 mass % or less of Mg that is an essential element, and further optionally contains Cu: 0 mass % or more and 0.070 mass % or less, Zn: 0 mass % or more and 0.60 mass % or less, Fe: 0 mass % or more and 0.50 mass % or less, Si: 0 mass % or more and 0.50 mass % or less, Cr: 0 mass % or more and 0.20 mass % or less, Mn: 0 mass % or more and 0.50 mass % or less, Zr: 0 mass % or more and 0.20 mass % or less, and Be: 0 mass % or more and 0.0020 mass % or less, and the balance consists of aluminum and unavoidable impurities.

In another embodiment, the aluminum alloy used for the aluminum alloy substrate contains Fe that is an essential element and one or two of Mn and Ni that are optional elements, and the total of contents of Fe, Mn and Ni is 1.0 mass % or more and 7.0 mass % or less, and further, the aluminum alloy optionally contains Si: 0 mass % or more and 14.0 mass % or less, Zn: 0 mass % or more and 0.7 mass % or less, Cu: 0 mass % or more and 1.0 mass % or less, Mg: 0 mass % or more and 4.5 mass % or less, Cr: 0 mass % or more and 0.30 mass % or less, Zr: 0 mass % or more and 0.20 mass % or less, Be: 0 mass % or more and 0.0015 mass % or less, Sr: 0 mass % or more and 0.1 mass % or less, Na: 0 mass % or more and 0.1 mass % or less, and P: 0 mass % or more and 0.1 mass % or less, and the balance consists of aluminum and unavoidable impurities.

In the aluminum alloy used for the aluminum alloy substrate, elements other than the aforementioned essential components and optional components, which become unavoidable impurities, may be contained. Examples of these elements include Ti, V and Ga, and the content of each of the elements is 0.10 mass % or less, and the total content thereof is 0.30 mass % or less. Si can be actively added as an optional component, but it may not be added. Si is contained not only in a ground metal of general purity but also in a ground metal of high purity having an Al purity of 99.9% or more, as an unavoidable impurity. When Si is contained as an unavoidable impurity as above, it is preferable that the content of Si be 0.10 mass % or less.

(Method for Producing Aluminum Substrate for Magnetic Disk)

Hereinafter, one example of steps of a production process of an aluminum alloy substrate for a magnetic disk and process conditions will be described.

First, a molten metal of an aluminum alloy material having the aforementioned component composition is prepared by conducting heating/melting in accordance with a conventional method. Thereafter, the molten metal of an aluminum alloy material prepared is casted by a semi-continuous casting (DC casting) method, a continuous casting (CC casting) method, or the like, thereby casting the aluminum alloy material. An aluminum alloy ingot produced by DC casting is subjected to homogenization treatment as needed. Thereafter, the aluminum alloy ingot (DC casting) subjected to homogenization treatment or no homogenization treatment is hot rolled to prepare a plate material. Thereafter, a rolled plate prepared by hot rolling or a cast plate prepared by a CC casting method is cold rolled to prepare an aluminum alloy plate. Prior to the cold rolling or in the middle of the cold rolling, annealing treatment may be conducted in order to ensure cold rolling workability. Subsequently, the aluminum alloy plate obtained by cold rolling is punched out into an annular shape to prepare an annular aluminum alloy plate. The annular aluminum alloy plate becomes a disk blank through pressure flattening treatment. Prior to zincate treatment or the like, the disk blank is subjected to cutting work/grinding work, and if necessary, heating treatment. Thereafter, the disk blank surface is subjected to degreasing, etching and zincate treatment (Zn substitution treatment). In the zincate treatment, a zincate coating film is formed on the disk blank surface. Furthermore, the disk blank surface subjected to zincate treatment is subjected to electroless Ni—P plating treatment as surface treatment for magnetic body adhesion. On the plating surface after the electroless Ni—P plating treatment, polishing for smoothing is conducted. Thus, an aluminum substrate for a magnetic disk is produced through the surface polishing after the plating treatment.

(Glass Substrate for Magnetic Disk)

As the substrate for a magnetic disk, for example, a glass substrate formed of a glass material can also be used. Regarding the glass substrate for a magnetic disk, a glass material applied thereto and a production method of a glass substrate will be each described in detail hereinafter.

(Glass Material)

As the glass used for the substrate for a magnetic disk, a glass containing 55 mass % or more and 75 mass % or less of $SiO_2$ as a main component, and further containing $Al_2O_3$: 0.7 mass % or more and 25 mass % or less, $LiO_2$: 0.01 mass % or more and 6 mass % or less, $Na_2O$: 0.7 mass % or more and 12 mass % or less, $K_2O$: 0 mass % or more and 8 mass % or less, MgO: 0 mass % or more and 7 mass % or less, CaO: 0 mass % or more and 10 mass % or less, $ZrO_2$: 0 mass % or more and 10 mass % or less, and $TiO_2$: 0 mass % or more and 1 mass % or less is known. In such a glass, not only $B_2O_3$ (contained, as an essential component, in aluminoborosilicate glass and borosilicate glass) that decreases viscosity and increases meltability and clarity, SrO and BaO that decrease high-temperature viscosity, improve meltability, clarity and moldability, and exhibit an improving effect for Young's modulus, ZnO that improves ion exchange performance and deceases high-temperature viscosity without decreasing low-temperature viscosity, $SnO_2$ that improves clarity and ion exchange performance, $Fe_2O_3$ that is a colorant, etc. but also $As_2O_3$ and $Sb_2O_3$ as clarifiers may be contained. Moreover, the glass may contain an oxide of La, P, Ce, Sb, Hf, Rb, Y or the like as a trace element.

(Method for Producing Glass Substrate for Magnetic Disk)

Thereafter, one example of a method for producing a glass substrate for a magnetic disk will be described.

First, a glass material prepared so as to have prescribed chemical components is melted, and a molten lump thereof is press molded from both sides by a direct pressing method to prepare a glass original plate having a desired thickness. Preparation of the glass original plate is not limited to the direct pressing method, and the preparation method may be a floating method, a fusion method, a redraw method, or the like. Thereafter, this glass original plate is subjected to coring into an annular shape, and further, an inner diameter portion and an outer diameter portion are subjected to polishing work to prepare an annular glass plate having desired inner diameter dimension, outer diameter dimension and chamfer length. After that, both surfaces of this annular glass plate are ground by a grinding machine (hereinafter, lapping work) to prepare an annular glass substrate having desired plate thickness and flatness. Furthermore, both surfaces of this annular glass substrate are polished by a polishing machine to prepare a disk having a desired thickness, that is, a glass substrate. In the middle of the polishing work, chemical strengthening treatment with a sodium nitrate solution, a potassium nitrate solution or the like may be conducted. Thus, a glass substrate for a magnetic disk is produced through the surface polishing.

(Other Configurations)

The magnetic disk may further have, in addition to the aluminum alloy substrate for a magnetic disk or the glass substrate for a magnetic disk, a magnetic body layer laminated on these substrates. Furthermore, it may have a protective layer that is made of a carbon-based material such as diamond-like carbon and is laminated on the magnetic body layer, a lubricating layer that is made of a lubricating oil and is coated on the protective layer, etc.

Hereinbefore, the thin substrate built-in hard disk drive and the base plate member for a thin substrate built-in hard disk drive according to the present embodiments have been described, but the present disclosure is not limited to the aforementioned embodiments, and various modifications and changes can be made based on the technical concept of the present disclosure.

EXAMPLES

Hereinafter, examples of the present disclosure will be described, but the present disclosure is not limited to these examples without departing from the spirit of the present disclosure.

<Preparation of Base Plate Member Made of Aluminum Alloy>

Base plate members made of aluminum alloys used for evaluation in Examples and Comparative Examples were prepared by the following method.

Regarding Examples and Comparative Examples, molten metals having chemical components shown in Table 1 were prepared in a melting and holding furnace. Thereafter, each of the molten metals in the melting and holding furnace was fed to a mold to prepare a base plate member (test material) having a thickness of 1.5 mm. A time in which the molten metal temperature was in the range of 550 to 700° C. is shown in Table 1.

A method for measuring a perimeter and the longest diameter of a second phase particle in each test material and a method for evaluating impact resistance will be described hereinafter.

<Method for Measuring Perimeter and the Longest Diameter of Second Phase Particle>

After a surface of the base plate member was polished, the surface was observed by an optical microscope at 400-fold magnification in a field of view of 0.07 $mm^2$ or more without using a polarizing filter, and by using particle analysis software (trade name: particle analysis software A-zo-kun, manufactured by Asahi Kasei Engineering Corporation), a perimeter (mm/$mm^2$) and the longest diameter of a second phase particle were measured. Distinguishment between the second phase particle and the matrix was made by light and dark contrasts in an image photographed by the optical microscope, and a portion that had darker or lighter contrast than the matrix was determined as a second phase particle. When measurement was conducted using a base plate, a surface of an optional place in an area on one surface side of the disk, that is, an area indicated by solid fill, of an area enclosed by a radius r 25 mm and a radius r 30 mm from the center C of the disk shown in FIG. 4, was polished, and the measurement was conducted.

TABLE 1

| | Chemical components of molten metal (composition of aluminum alloy) | | | | | | | | | | | |
|---|---|---|---|---|---|---|---|---|---|---|---|---|
| | Si | Fe | Cu | Mn | Mg | Zn | Cr | Ti | B | V | Se | Zr |
| Example 1 | 11 | 0.3 | 0.02 | 0 | 1 | 0.34 | 0 | 0 | 0 | 0 | 0 | 0 |
| Example 2 | 12 | 0.3 | 0.02 | 0 | 2 | 0.34 | 0 | 0 | 0 | 0 | 0 | 0 |
| Example 3 | 20 | 0.3 | 4 | 0 | 0 | 3 | 0 | 0 | 0 | 0 | 0 | 0 |
| Example 4 | 0.02 | 0.09 | 0.02 | 0.38 | 1.4 | 0.34 | 0 | 0 | 0 | 0 | 0 | 0 |
| Comparative Example 1 | 0.07 | 1.5 | 0.02 | 0.4 | 0 | 0.37 | 0.01 | 0.01 | 0 | 0.05 | 0 | 0 |
| Comparative Example 2 | 0.02 | 0.02 | 0.02 | 0 | 4 | 0.32 | 0.05 | 0 | 0 | 0 | 0.0015 | 0 |

| | Chemical components of molten metal (composition of aluminum alloy) | | | | | Time in which molten metal temperature is in the range of 550 to 700° C. (h) | Perimeter of second phase particles having longest diameter of 10 μm or more (mm/$mm^2$) | The number of second phase particles having longest diameter of 500 μm or more (particles/$mm^2$) |
|---|---|---|---|---|---|---|---|---|
| | Ni | P | Na | Sr | Al + Fe + Mn + Ni unavoidable impurities | | | |
| Example 1 | 5.75 | 0 | 0 | 0.02 | 6.05 Balance | 0.1-1.0 | 360.7 | 0 |
| Example 2 | 0 | 0 | 0 | 0.02 | 0.3 Balance | 0.1-1.0 | 65.3 | 0 |
| Example 3 | 0 | 0 | 0 | 0.02 | 0.3 Balance | 0.1-1.0 | 139.8 | 0 |
| Example 4 | 1.9 | 0 | 0 | 0 | 2.95 Balance | 0.1-1.0 | 50.3 | 0 |
| Comparative Example 1 | 0 | 0 | 0 | 0 | 1.9 Balance | 1.5 | 4.8 | 1 |
| Comparative Example 2 | 0 | 0 | 0 | 0 | 0.02 Balance | 0.1-1.0 | 1.0 | 0 |

As shown in Table 1, in the test materials of Examples 1 to 4, a perimeter of a second phase particle having the longest diameter of 10 μm or more exposed on the surface of the test material was 3 mm/mm² or more, and the number of second phase particles having the longest diameter of 500 μm or more is 0 particles/mm². As shown in FIG. 2, when the perimeter of the second phase particle having the longest diameter of 10 μm or more is 3 mm/mm² or more in the metallographic structure of the base plate, the base plate can be evaluated as being able to reduce the impact transmitted to the magnetic disk. On that account, by citing FIG. 2, these test materials can be evaluated as being able to increase impact resistance of the magnetic disk.

On the other hand, regarding the test material of Comparative Example 1, the time in which the molten metal temperature was in the range of 550 to 700° C. was 1.5 hours, and a large number of second phase particles having the longest diameter of 500 μm or more were formed. On that account, the number of second phase particles having the longest diameter of 500 μm or more is 1 particle/mm², and this test material was ineligible for a base plate member.

Regarding the test material of Comparative Example 2, the perimeter of the second phase particle was 1.6 mm/mm² and was too short, so that by citing FIG. 2, this test material can be evaluated as inferior to the base plate member prepared from the test materials of Examples 1 to 4 in impact resistance characteristics.

What is claimed is:

1. A base plate member made of an aluminum alloy, for a thin substrate built-in hard disk drive comprising a metallographic structure in which a perimeter of a second phase particle having a longest diameter of 10 μm or more is 3 mm/mm² or more, and a number of second phase particles having a longest diameter of 500 μm or more is 0 particles/mm².

2. The base plate member according to claim 1, wherein a thickness is 0.5 mm or more and 2.0 mm or less.

3. A thin substrate built-in hard disk drive comprising: a magnetic disk in a disk shape having a through-hole at the center; a spindle motor inserted into the through-hole of the magnetic disk and co-rotatably supporting the magnetic disk; and a base plate made of an aluminum alloy and supporting the spindle motor, wherein the base plate has a metallographic structure in which a perimeter of a second phase particle having a longest diameter of 10 μm or more is 3 mm/mm² or more, and a number of second phase particles having a longest diameter of 500 μm or more is 0 particles/mm².

4. The thin substrate built-in hard disk drive according to claim 3, wherein a thickness of the base plate is 0.5 mm or more and 2.0 mm or less.

* * * * *